United States Patent
Abraham (10) Patent No.: US 9,400,733 B2
(45) Date of Patent: Jul. 26, 2016

(54) PATTERN MATCHING FRAMEWORK FOR LOG ANALYSIS

(75) Inventor: Robin Abraham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 453 days.

(21) Appl. No.: 12/958,099

(22) Filed: Dec. 1, 2010

(65) Prior Publication Data

US 2012/0143893 A1     Jun. 7, 2012

(51) Int. Cl.
    *G06F 7/00*     (2006.01)
    *G06F 17/30*    (2006.01)
    *G06F 11/34*    (2006.01)

(52) U.S. Cl.
    CPC ...... *G06F 11/3476* (2013.01); *G06F 17/30398* (2013.01); *G06F 2201/86* (2013.01)

(58) Field of Classification Search
    CPC ................... G06F 17/30392; G06F 17/30398; G06F 17/30554
    USPC .................................. 707/705, 706, 758, 769
    See application file for complete search history.

(56) References Cited

U.S. PATENT DOCUMENTS

| | | | | |
|---|---|---|---|---|
| 5,555,403 | A * | 9/1996 | Cambot et al. | 395/600 |
| 5,701,400 | A * | 12/1997 | Amado | 706/45 |
| 5,701,456 | A | 12/1997 | Jacopi et al. | |
| 6,446,086 | B1 * | 9/2002 | Bartlett et al. | 707/200 |
| 7,668,608 | B2 | 2/2010 | Nixon et al. | |
| 7,788,641 | B2 | 8/2010 | Tarr et al. | |
| 2003/0061193 | A1 * | 3/2003 | Anson | 707/1 |
| 2005/0004911 | A1 * | 1/2005 | Goldberg et al. | 707/7 |
| 2005/0187911 | A1 * | 8/2005 | Tunning | 707/3 |
| 2007/0156718 | A1 * | 7/2007 | Hossfeld et al. | 707/100 |
| 2007/0220428 | A1 * | 9/2007 | Kureshy et al. | 715/708 |
| 2008/0221834 | A1 * | 9/2008 | Damodharan | 702/183 |
| 2009/0182856 | A1 * | 7/2009 | Gotta et al. | 709/223 |

OTHER PUBLICATIONS

"An Architecture for Embedded Intelligent Components", Retrieved at << http://www.amzi.com/articles/prolog_custom_krl.htm >>, Jan. 2001, pp. 5.

Schurr, Andy, "PROGRES, A Visual Language and Environment for Programming with Graph rewriting Systems", Retrieved at << http://citeseerx.ist.psu.edu/viewdoc/download?doi=10.1.1.31.4773&rep=rep1&type=ps >>, 1994, pp. 1-21.

Batini, et al., "Visual Strategies for Querying Databases", Retrieved at << http://ieeexplore.ieee.org/stamp/stamp.jsp?tp=&arnumber=238834 >>, In IEEE Workshop on Visual Languages, Oct. 8, 1991, pp. 183-189.

(Continued)

*Primary Examiner* — Marc Somers (74) *Attorney, Agent, or Firm* — Kate Drakos; Micky Minhas (57) ABSTRACT

A pattern matching framework for log analysis is described. In one or more implementations, one or more inputs are received via a user interface of a computing device that describe a filter pattern that specifies data that is to be matched and extracted from a log and a projection pattern that specifies how at least a portion of the data extracted using the filter pattern is to be output. A query is formed from the filter pattern and the projection pattern by the computing device that is configured to analyze the log.

20 Claims, 11 Drawing Sheets

(56) References Cited

OTHER PUBLICATIONS

Telea, et al., "Architecting an Open System for Querying Large C and C++ Code Bases", Retrieved at << http://www.win.tue.nl/~alext/ALEX/PAPERS/SACJ/paper.pdf >>, 2008, pp. 16.

"Foreign Office Action", CN Application No. 201110394173.2, Dec. 3, 20013, 11 pages.
"Office Action & Search Report Received for Chinese Patent Application No. 201110394173.2", Mailed Date: Aug. 4, 2014, 9 Pages.
"Foreign Notice of Allowance", CN Application No. 201110394173.2, Dec. 22, 2014, 4 Pages.

* cited by examiner

1702
Output a user interface by a computing device that is configured to include a plurality of shapes, one or more of which are configurable to specify data to be represented by the shape and arranged in the user interface, one to another, to define a pattern of the data

1704
Receive one or more inputs via a user interface of a computing device that describe a filter pattern that specifies data that is to be matched and extracted from a log and a projection pattern that specifies how at least a portion of the data extracted using the filter pattern is to be output

1706
Form a query from the filter pattern and the projection pattern by the computing device that is configured to analyze the log

1802
Receive a query at a computing device, the query including a filter pattern and a projection pattern, each of the filter pattern and the projection pattern defined by data represented by each of a plurality of shapes and arrangement of the plurality of shapes in a user interface, one to another

1804
Analyze a log by the computing device using the query

1806
Extract data from the log that matches the filter pattern

1808
Output the extracted data that matches the projection pattern

*Fig. 18*

PATTERN MATCHING FRAMEWORK FOR LOG ANALYSIS

BACKGROUND

Logs may be used by computing devices for a wide variety of purposes. For example, logs may be used to record events encountered during installation of software, such as error messages and so on. Thus, the log may serve as a written record of events that are encountered by one or more computing devices.

As the usage of computing devices becomes ever increasingly more prevalent, however, the logs that are generated to describe the events may also be corresponding larger. For example, a log used to track events encountered by a search engine may consume fifteen terabytes to describe events encountered in a single day. However, traditional techniques that were developed to analyze logs could be inefficient and therefore ill suited when confronted with the vast amount of information that may be encountered in current logs.

SUMMARY

A pattern matching framework for log analysis is described. In one or more implementations, one or more inputs are received via a user interface of a computing device that describe a filter pattern that specifies data that is to be matched and extracted from a log and a projection pattern that specifies how at least a portion of the data extracted using the filter pattern is to be output. A query is formed from the filter pattern and the projection pattern by the computing device that is configured to analyze the log.

In one or more implementations, a user interface is output by a computing device that is configured to include a plurality of shapes, one or more of which are configurable to specify data to be represented by the shape and arranged in the user interface, one to another, to define a pattern of the data. A query is formed by the computing device for one or more of the patterns defined by the arrangement of the plurality of shapes, one to another, and the data represented by the shapes, the query to be used to analyze a log.

In one or more implementations, a query is received at a computing device, the query including a filter pattern and a projection pattern, each of the filter pattern and the projection pattern defined by data represented by a plurality of shapes and arrangement of the plurality of shapes in a user interface, one to another. A log is analyzed by the computing device using the query, the analyzing including extracting data from the log that matches the filter pattern and outputting the extracted data that matches the projection pattern.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Logs may be used to describe a variety of different events encountered by a variety of different computing devices. For example, the events may range from describing installation of software on a single computing device to execution of a search engine by a server farm and so on. However, traditional techniques that were used to analyze logs were often inflexible and inefficient and therefore not well suited to working with these different types of logs that may describe a wide range of situations.

A pattern matching framework for log analysis is described. In one or more implementations, a query language is described that allows users to specify patterns (e.g., two-dimensional patterns) for the analysis of logs, such as operational profiles and so on. Thus, the query language may be configured to support expressive descriptions of patterns that may be used to analyze logs that describe a wide variety of situations. In the following discussion, a framework of the query engine is described in relation to an example environment. A frame language is then described along with a visual representation of the language that may be utilized to ease the development and manipulation of queries. Examples are included that illustrate the expressiveness of the query language, followed by example procedure that may be performed using the example environment and elsewhere.

Example Environment

Figure 1:
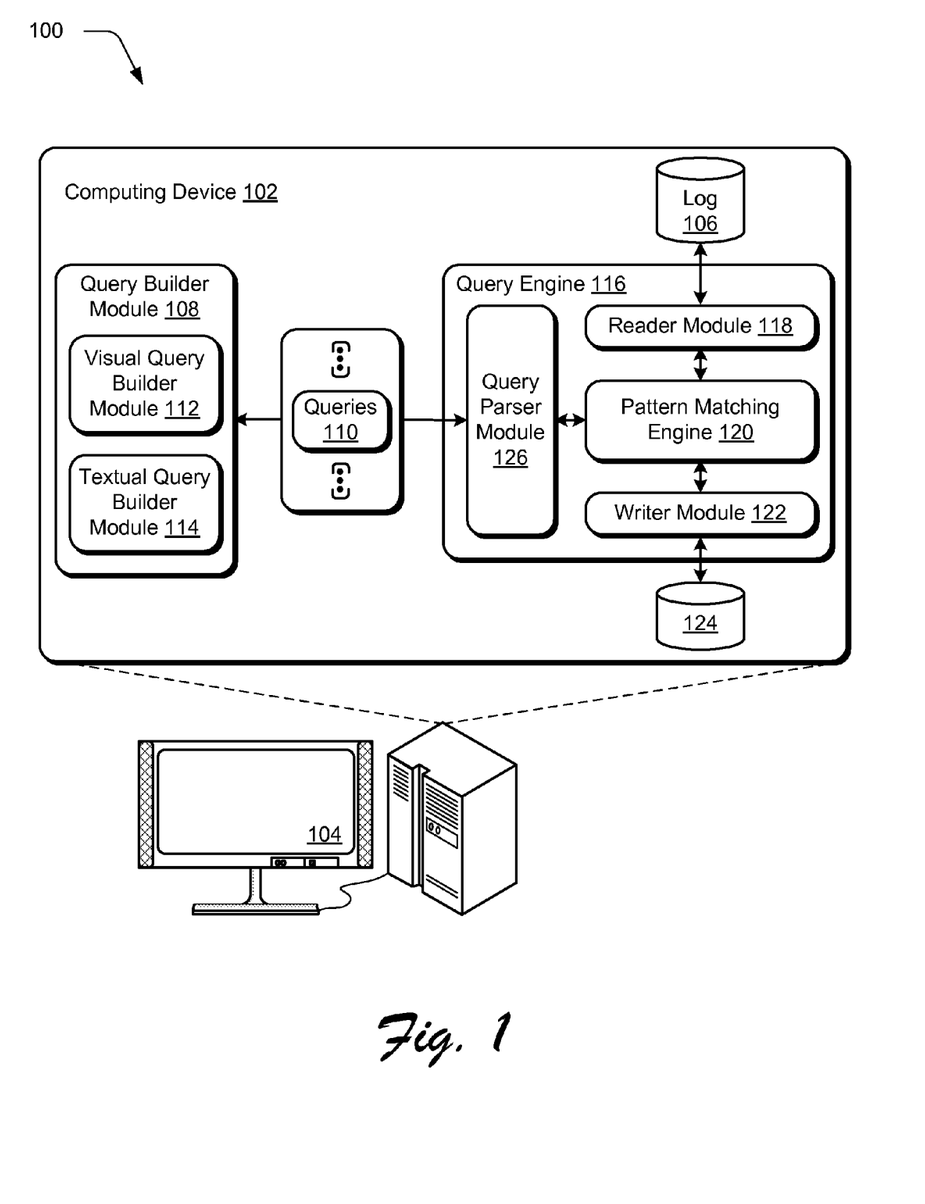
FIG. 1 is an illustration of an environment in an example implementation that is operable to employ a pattern matching framework for log analysis.

FIG. 1 is an illustration of an environment 100 in an example implementation that is operable to employ techniques described herein. The illustrated environment 100 includes a computing device 102, which may be configured in a variety of ways. For example, the computing device 102 may be configured as a computer that is communicatively coupled to a display device 104 as illustrated, a notebook computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations, a remote control and set-top box combination, an image capture device and a game console configured to capture gestures, and so on.

The computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Traditional approaches to processing logs 106 (hereinafter also referred to as "log files") varied from developers opening up the log files and manually inspected each of them to identify issues to employing "find" functionality of editor applications. Even though the "find" functionality could speed up the process of identifying hotspots within the log file, these approaches were both tedious and prone to error.

Further, these traditional approaches did not scale to address analysis of numerous log files and were ill suited to address patterns. For example, some of the more expressive traditional approaches for logs 106 involving operational profile analyses involved implicitly converting logs into tables, and supported the use of a subset of SQL to query them. While such approaches may be powerful in extracting aggregate information, these approaches were not suited for extracting patterns. For logs from a web server, for example, such approaches may be used to aggregate information or to extract events that match a specific filter. For instance:
 1) Pages browsed by a user with a specific IP address.
 2) Number of visitors to a specific page.
 3) Number of visitors from a specific country.
However, these approaches may have shortcomings in describing patterns as shown in the following examples:
 1) How many visitors visited pages A, B, and C, in that order? Such a query can be constructed in SQL using self-joins (one for A-B, and another for B-C) to thread records pertaining to individual visitors through a sequence of events. This solution becomes computationally expensive when larger log files and longer sequence of events are involved.
 2) How many users who visited page A did not visit B followed by C or C followed by D? Once again, such queries traditionally involved "self joins" and were computationally expensive.
Thus, traditional approaches did not support a general pattern matching framework for extracting information from logs that describe execution traces, operation profiles, configured as event logs, and so on.

In one or more implementations, a query language is described that allows users to specify two-dimensional patterns. The query language may use regular expressions for pattern matching at a level of lines within logs 106. Furthermore, the query language may allow the users to specify how these individual lines are "laid out" within a log 106 relative to one another.

The following are three examples of logs 106 involving operational profile analyses that involve higher order pattern matching and may be carried out using the query language described herein:
 1) Given logs from a set of devices, how many of them had install attempts of KBXXXXXX fail with error code E, followed by install failure of KBXXXXXX with error code E', finally followed by install success of the same KB?
 2) Given logs from a set of devices and three known scenarios for failures with a particular error code, isolate the logs for failures with the same error code that do not fit the know scenarios.
 3) Given logs from a search engine, what sort of browsing patterns are exhibited by potentially unhappy users?
A query builder module 108 is illustrated that is representative of functionality to enable a user to build queries 110. For example, the query builder module 108 as illustrated includes a visual query builder module 112 that is representative of functionality to build the queries 110 using a graphical user interface that may be output for display on the display device 104. The query builder module 108 is also illustrated as including a textual query builder module 114 to build text queries. Thus, the query builder module 108 is configured to allow a user to manipulate queries 110 as text or in the visual query language described in greater detail below. Fully or partially developed queries 110 can be saved as query files. For example, the files may store queries in a textual format. These query files may then be passed as an input to a query engine 116 for processing.

The query engine 116, as illustrated, includes a reader module 118 that is representative of functionality to read logs 106. For example, the reader module 118 may be configured to read operational profile information stored as plain text file, structured xml, extracted from a database using a SQL query, and so on. The reader module 118 may then provide this data to a pattern matching engine 120 for processing, such as to match data from the logs with the queries 110. A result of this processing may then be provided to a writer module 122 to be written to storage 124.

The writer module 122 may output the matched patterns in a variety of ways, such as plain text, structured xml (with variable names from the filter pattern as tags), insert the structured results into a database table, and so on. The query engine 116 is also illustrated as including a query parser 126 that is representative of functionality to parse the queries 110 (e.g., input query files) for processing of the input.

The reader module 118 is also configured to allow a user to specify an amount of the log 106 (e.g., an input file) that is to be read and processed, which may help improve a speed at which the file may be processed. A few examples are given as follows:

1) Process the query on the first "n" lines of the input file.
2) Process the query on the last "n" lines of the input file.
3) Break up the input file into chunks of 50 lines each, and then process the query on each of those chunks.

In one or more implementations, the default setting is to process the entire input file although other default implementations are also contemplated. It may also be desirable to process queries in a single pass through an input data file to take into account input data files that contain a relatively large amount of data.

Queries 110 that contain bounded "lookaheads" may be amenable to optimizations with respect to the number of lines, from the input file, that are retained in memory for frame instances that are being processed. On the other hand, a poorly written query with an unbounded lookahead may result in matches that span an entire input file in the worst case. Poorly designed queries may also find a multitude of matches, which may result in a large number of partially matched frames being stored in memory.

Accordingly, in one or more implementations the pattern matching engine 120 may write its state to a temporary file and output a runtime error when encountered. A user may then have an option to make one or more changes to the projection pattern as further described below and resume query processing from the saved state, restart query processing from the beginning, and so on. For example, if changes are made to a filter pattern as further described below, the user may restart processing of the new query from the beginning of the input. In this way, the pattern matching engine may reduce a likelihood of runtime errors due to incompatible cast operations in a projection pattern of a query. Such runtime errors are expensive from a computational point of view since the errors could occur after the filter pattern has been matched, and even potentially after a relatively large amount of data in an input file has been traversed. Further discussion of operation of the environment may be found in relation to the following sections beginning in relation to the "Frame Language" section.

Generally, any of the functions described herein can be implemented using software, firmware, hardware (e.g., fixed logic circuitry), manual processing, or a combination of these implementations. The terms "module," "engine," and "functionality" as used herein generally represent hardware, software, firmware, or a combination thereof. In the case of a software implementation, the module, functionality, or engine represents instructions and hardware that performs operations specified by the hardware, e.g., one or more processors and/or functional blocks.

Frame Language

A query may be formed from two patterns, a filter pattern and a projection pattern. The filter pattern specifies data that is to be matched and extracted from an input file. The projection pattern specifies data that is to be written to an output file.

An example grammar that may be employed for the filter pattern is introduced along with corresponding productions as follows. Further definition of the grammar follows this introduction.

| After       | -> int                                      |
|-------------|---------------------------------------------|
| Repeats     | -> [<\|>] int \| '*' \| '+'                 |
| Occurrences | -> int \| '+'                               |
| Var         | -> string                                   |
| Str         | -> [Var] regex \| Var                       |
| Pat         | -> Str \| Str + Pat                         |
| BPat        | -> [After] [Repeats] Pat                    |
| Block       | -> BPat \| BPat + Block                     |
| Frame       | -> Block && Frame \| Block \|\| Frame \| !Frame \| Block |
| Filter      | -> [Occurrences] Frame                      |

Since regular expressions may be used for matching substrings within lines of the input file, in the above grammar, regular expressions (regex) may be treated as terminals along with "string" and "int."

"Str" matches a substring in a line of input with either a "string" or a "regex." Optionally, a match may be bound to a variable and referenced later in a filter pattern or in a projection pattern.

A pattern (Pat) includes a "Str" or a "Str" concatenated with a "Pat." A pattern matches one line in the input data file.

A block includes a marker pattern (the pattern to detect the first line within a block) followed by a list of look-ahead patterns. A bounded look-ahead pattern involves a line that is a specified number of lines (After) after the line that matches the marker pattern for block. An unbounded look-ahead pattern, on the other hand, may match any line after the line that matches the marker pattern for the block. In an implementation this is a default if "After" is not specified. Moreover, a pattern may match one or more repeating occurrences (Repeats) of a line within the input. In an implementation the default is one match if "Repeat" is not specified.

A filter pattern (Frame) may involve a conjunction (&&) or disjunction (||) of a block and a frame. A filter pattern (Frame) may also involve a negation (!) of a frame or a block pattern. The "Occurrences" specified for the filter pattern may be used to determine a number of matching instances from the input that is returned. In an implementation, the default is to fetch each of the matches although other defaults are contemplated. A visual representation of the frame language may be used to build and manipulate queries as further described below.

Recall functionality may be employed in which bound variables in a filter query may be reused later within the same query to match the same content automatically. This recall functionality may be useful in constructing filter patterns across events that have common aspects (e.g., error code, machine, user, and so on) as shown in the examples in the following sections.

The projection pattern is used to control how the content from the input file that matches the filter pattern is displayed in the output. For instance, the projection pattern may be used to control which parts of the matched content, if any, is displayed and how the parts are displayed in the query output. The following elements may be used in composing projection patterns.

1) Global Variables

Global variables may be used in the filter and projection patterns. Examples of global variables include output file name (Outfile), timestamp when the query processing began (StartTimestamp), timestamp when the query processing ended (EndTimestamp), and current date (CurDate).

2) Bound Variables from the Filter Pattern

Data from the input file may be displayed in the output file by using bound variables from the filter pattern as part of the projection pattern. Since a variable in the filter pattern may match more than one instance of text from the input file, the bound variables may be configured as arrays of matched values.

3) Static Text/Labels

The user may enter additional text as comments or labels in a projection pattern. These strings may be included "as is" in the generated output.

4) Aggregation Functions

Projection patterns may support use of aggregation functions like COUNT, DISTINCT, SUM, AVERAGE, MIN, MAX, and DATEDIFF on the bound variables.

5) Type Cast Operations

Since the input is read as strings, the user may desire, in some instances, to cast some of the matched content to other data types. Conversions from string to date, timestamp, integer, and decimal are supported. These may useful in a variety of instances, such as when the user runs aggregation functions on the matched content.

The above elements are reflected in an example grammar for the projection pattern as follows:

```
Var     -> string
Label   -> string
Str     -> Var | Label
Pat     -> Str | Str + Pat
MPat    -> Pat | Func | Pat + MPat
Func    -> FName (MPat [,MPat...])
FName   -> COUNT | DISTINCT | SUM | AVERAGE
           | MIN | MAX | DATEDIF | ToDate | ToTimestamp
           | ToInteger | ToDecimal
```

Note that the grammar for projection patterns may be extended to include additional functions that may be applied on the filtered matches.

If a projection pattern is not specified explicitly, each matched instance of the frames from the filter pattern may be written to the output. The output may then be subjected to further analysis.

Visual Representation of Frame Queries

This section includes a few of a variety of different examples of how visual elements may be used to represent corresponding constructs from the textual representation of frame queries.

Filter Patterns

Figure 2:
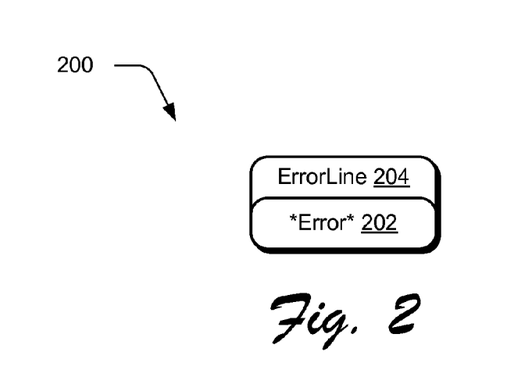
FIG. 2 depicts an example implementation of a visual representation in a user interface usable to specify a pattern for a query.

FIG. 2 depicts an example implementation 200 of a visual representation in a user interface usable to specify a pattern for a query. The example implementation illustrates "Str," which is a basic element of a visual representation.

The illustrated element is configured to be used to check for lines in the log 106 that contain the substring "Error" 202 (using the regex "*Error*") and binds matches to the variable "ErrorLine" 204. The same element may be used to match multiple lines that contain the substring "Error" 202 by creating a "BPat."

Figure 3:
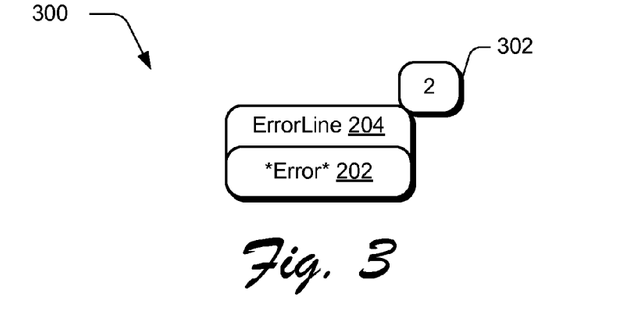
FIG. 3 depicts an example implementation of a visual representation in a user interface usable to match multiple lines in a log.

FIG. 3 depicts an example implementation 300 of a visual representation in a user interface usable to match multiple lines in a log. In the example implementation 300, a "BPat" is illustrated that may be used to match two lines in the log 106. This is performed in this example by setting a "Repeats" value 302 as "two." This pattern may be further expanded, an example of which is described in relation to the following figure.

Figure 4:
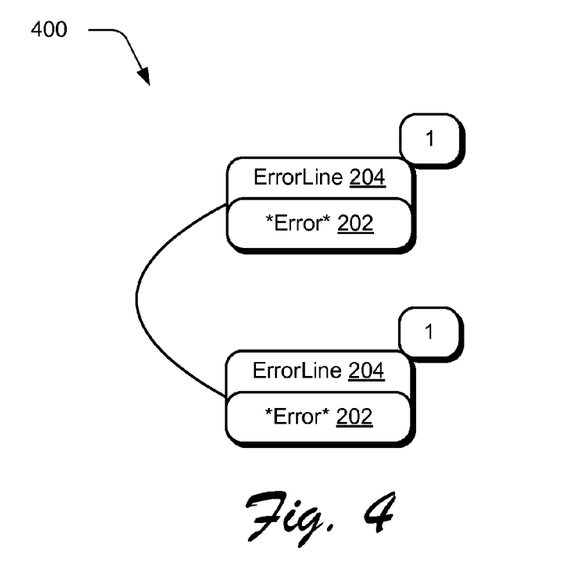
FIG. 4 depicts an example implementation of a visual representation in a user interface usable to specify patterns involving separation by any number of lines in a log.

FIG. 4 depicts an example implementation 400 of a visual representation in a user interface usable to specify patterns involving separation by any number of lines in a log. In this example, since "After" has not been specified, an unbounded "lookahead" is formed and the two matches may be separated by any number of lines. An example of matches that are to be separated by a specific number of lines in described in relation to the following figure.

Figure 5:
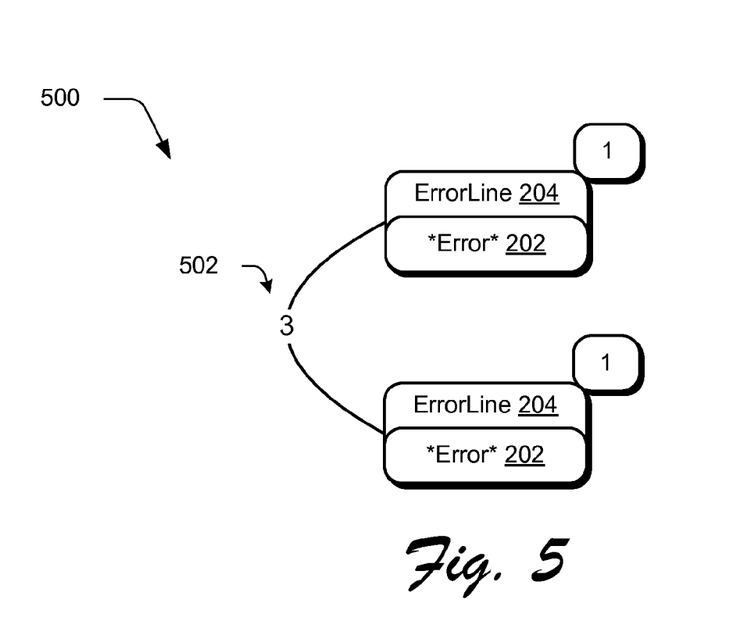
FIG. 5 depicts an example implementation of a visual representation in a user interface usable to specify patterns involving separation by a specific number of lines in a log.

FIG. 5 depicts an example implementation 500 of a visual representation in a user interface usable to specify patterns involving separation by a specific number of lines in a log. As illustrated, the pattern includes a value 502 of "three" is specified for "After" as separating two patterns. Thus, if the two matches are separated by three lines, irrespective of the contents of the three lines, a match is found.

Figure 6:
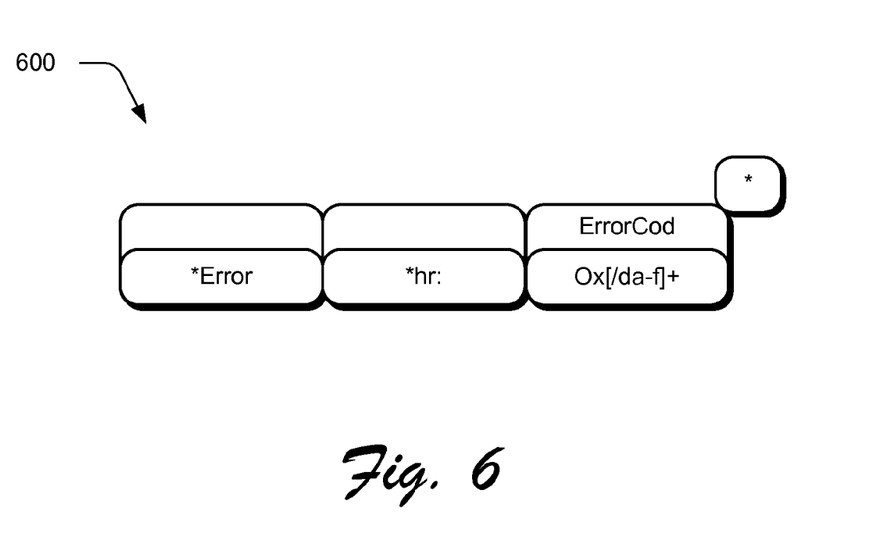
FIG. 6 depicts an example implementation of a visual representation in a user interface usable to specify patterns in a component based servicing (CBS) log.

FIG. 6 depicts an example implementation 600 of a visual representation in a user interface usable to specify patterns in a component based servicing (CBS) log. The following line from an example CBS log shows a common pattern (with key markers bolded) for log entries for install failures:

2009-02-06 23:57:46, Error CBS Failed to resolve Package:
Package_for_KB956391~31bf3856ad364e35~x86~~ 6.0.1.2. hr: 0x80070490

In the illustrated example query, the variable "ErrorCode" collects each hex error code value in the CBS log from lines that match the above log entry.

As per the illustrated query, lines in the log file are first identified that contain the substring "Error". The substring ending in "Error" is not bound to a variable and is discarded. The remainder of the input line ending in "hr:" is also discarded after matching since it is not bound to a variable. The remaining hex error code is bound to the variable "ErrorCode". The illustrated query may also be expanded capture a package name and a corresponding error code the install attempt failed an example of which is shown in the example implementation 700 of FIG. 7.

Figure 7:
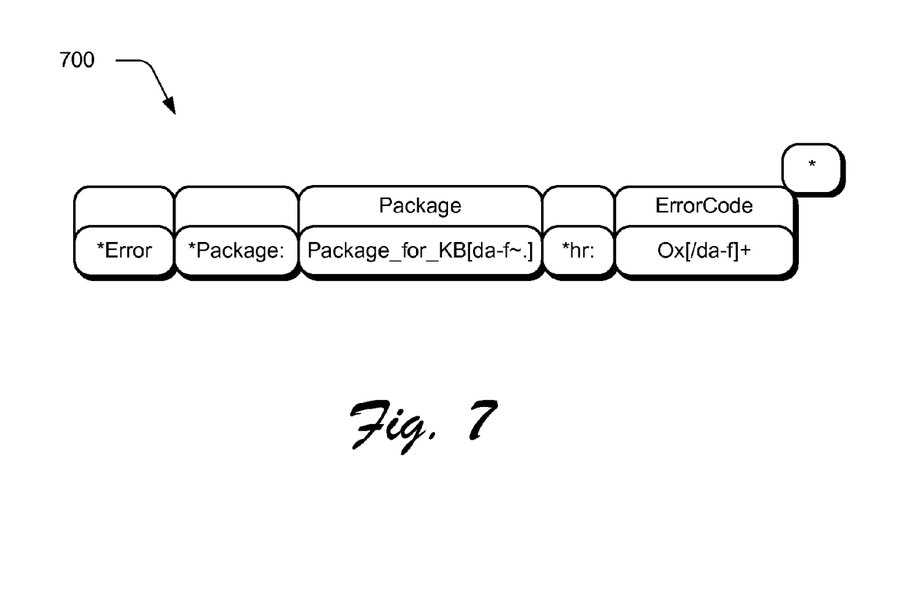
FIG. 7 depicts an example implementation in which the example implementation of FIG. 6 is expanded to capture a package name and a corresponding error code during which an install attempt failed.
Figure 8:
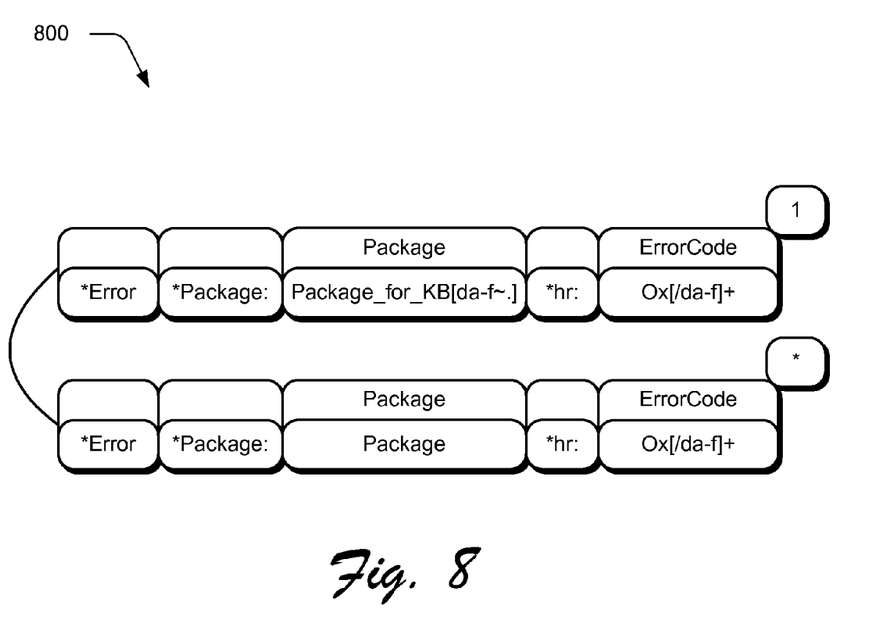
FIG. 8 depicts an example implementation in which a query of FIG. 7 is further modified to create a query to trace install failures of packages.

FIG. 8 depicts an example implementation 800 in which the query of FIG. 7 is further modified to create a query to trace install failures of packages. As before, the first pattern matches lines in CBS log that represent package install failures. The package name is bound to the variable "Package" and the error code is bound to the variable "ErrorCode". In the second pattern, the package name that is bound to the variable "Package" is used within the pattern to match package names. It should be noted that the change in representation to indicate that "Package", in this case, is a variable and not a string for matching. That is, this pattern will match zero or more lines in the log from install failures of the same package with the same or different error codes.

Figure 9:
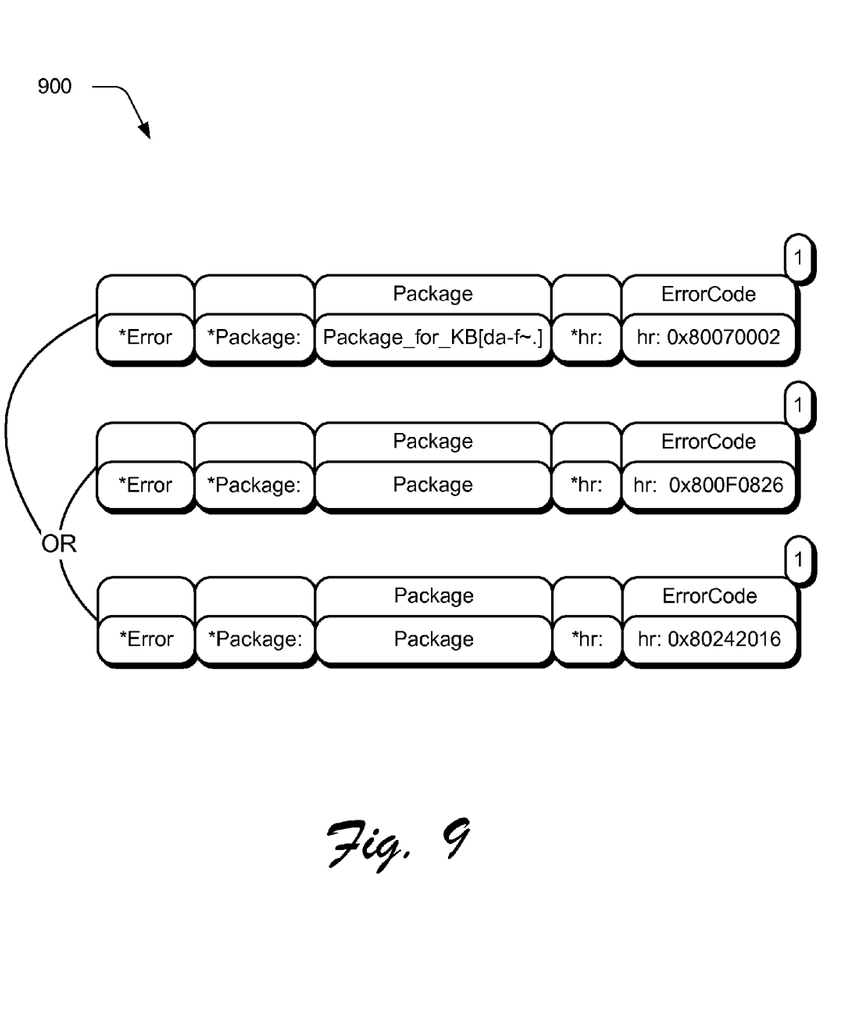
FIG. 9 depicts an example implementation in which a query of FIG. 8 is further modified to create a query to trace specific failure sequences for packages.

FIG. 9 depicts an example implementation 900 in which the query of FIG. 8 is further modified to create a query to trace specific failure sequences for packages. The first pattern is configured to match a package install failure. In this case, the package name is bound to the variable "Package" and instances of failure with error code 0x80070002 are matched. The frame matches subsequent failures of the same package (since the variable "Package" is used in the patterns) with either 0x800F0826 or 0x80242016 as the error code.

Figure 10:
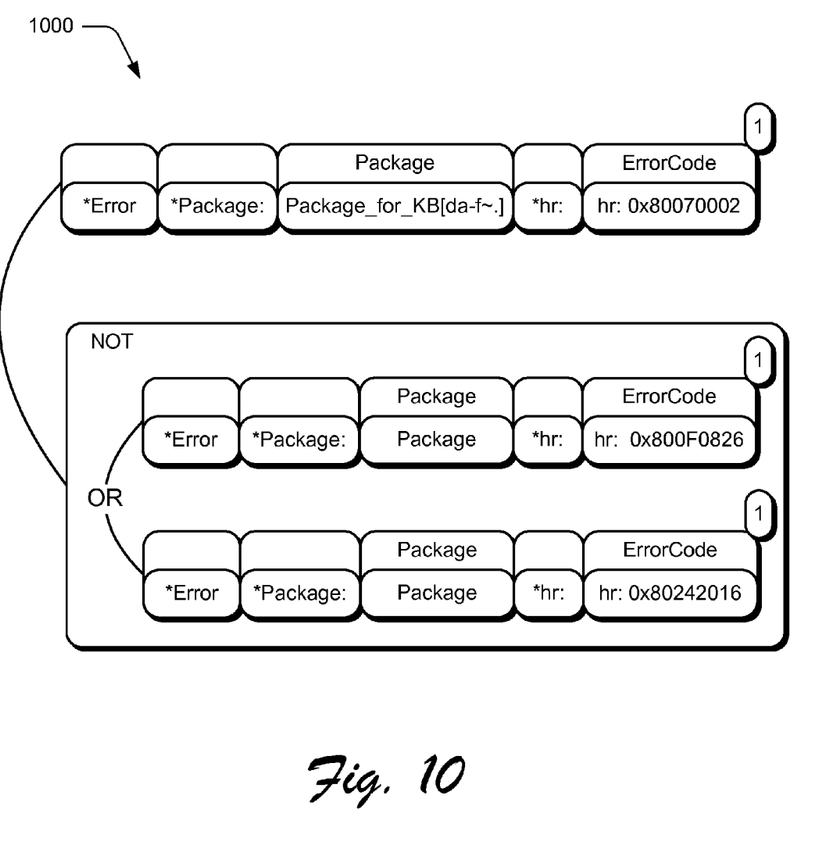
FIG. 10 depicts an example implementation in which a query of FIG. 9 is further modified to create a query using a logical negation operator to exclude content from the input that matches some patterns.

FIG. 10 depicts an example implementation 1000 in which the query of FIG. 9 is further modified to create a query using a logical negation operator to exclude content from the input that matches some patterns. In the illustrated example, the previous scenario of FIG. 9 is modified slightly such that if packages that failed with 0x80070002 but then did not fail with either 0x800F0826 or 0x80242016 are desired, a match if found.

Figure 11:
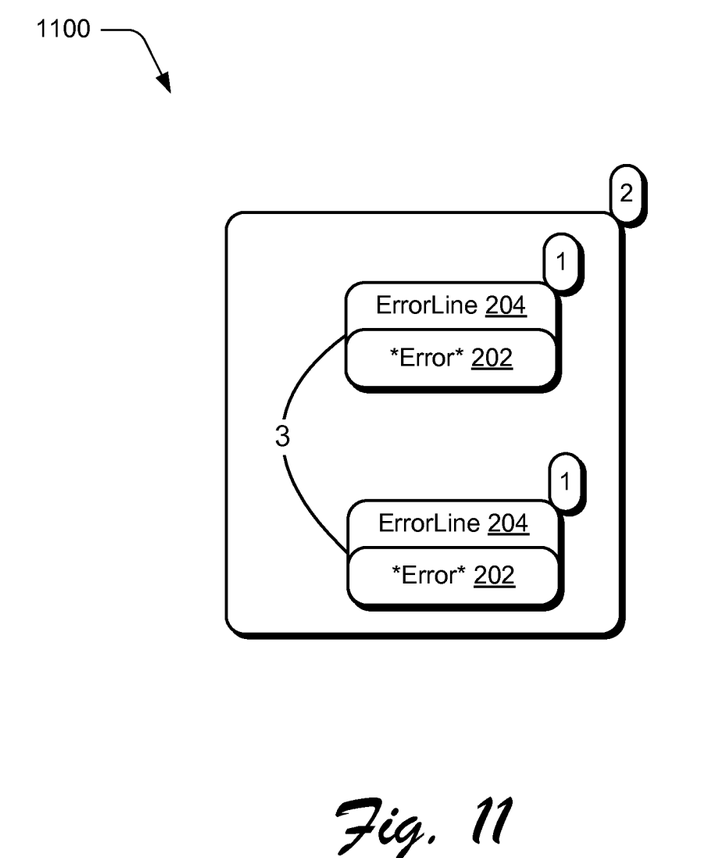
FIG. 11 depicts an example implementation in which a query of FIG. 2 is modified to create a query that involves a number of occurrences.

FIG. 11 depicts an example implementation 1100 in which the query of FIG. 2 is modified to create a query that involves a number of occurrences. The filter pattern together with corresponding "Occurrences" (a value of which is "2" in this case), is illustrated. Thus, in this example the "inner" pattern is matched twice to find an overall match for the query. A variety of other examples are also contemplated.

Projection Patterns

Projection patterns may also be formed from visual elements similar to those used in filter patterns. However, similar looking filter and projection patterns may imply very different underlying semantics.

Figure 12:
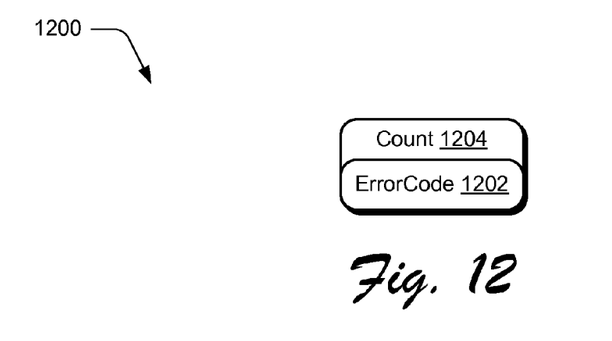
FIG. 12 depicts an example implementation of a projection pattern that is configured to return a number of instances from an input text that were bound to a variable "ErrorCode" in a filter pattern.

FIG. 12 depicts an example implementation 1200 showing a projection pattern that is configured to return a number of instances from an input text that were bound to the variable "ErrorCode" 1202 in the filter pattern. If there are no matches, then the projection pattern would return a zero. Each of the matches that were bound to the variable "ErrorCode"1202 may be listed by modifying the projection pattern by dropping an aggregation function "COUNT" 1204.

Figure 13:
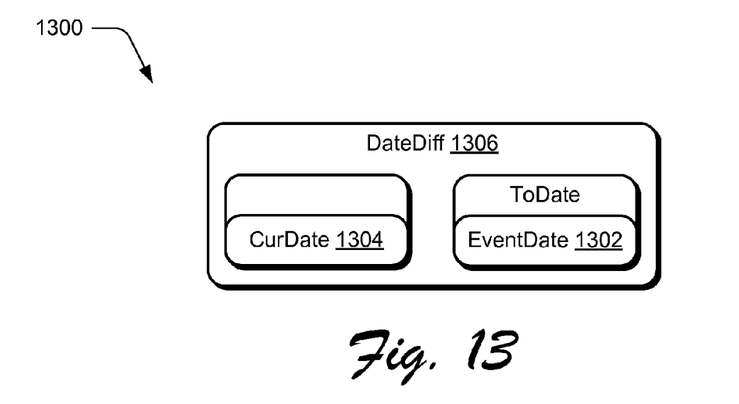
FIG. 13 depicts an example implementation showing another projection pattern.

FIG. 13 depicts an example implementation 1300 showing another projection pattern. In this example, instances bound to a variable "EventDate" 1302 are first cast as date values. The differences in number of days between the current date (accessible through the global variable CurDate 1304) and the "EventDate" 1302 instances are then computed using a "DateDiff" function 1306.

Figure 14:
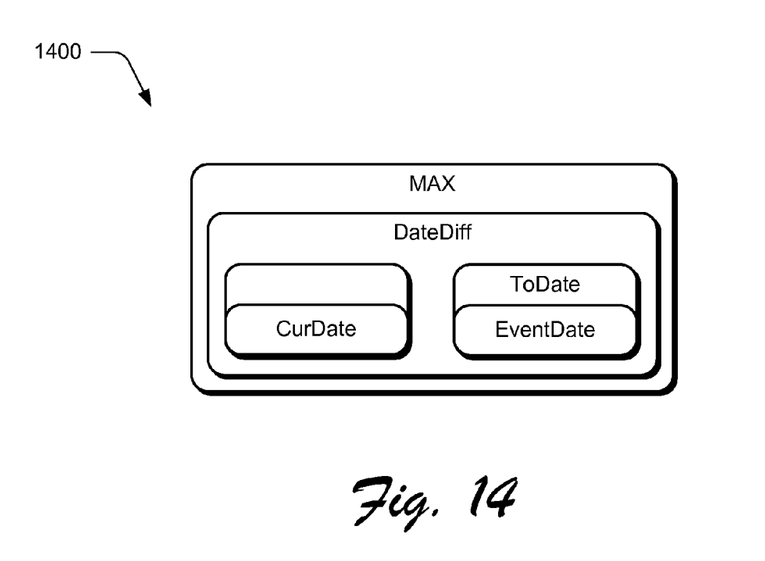
FIG. 14 depicts an example implementation showing modification to the projection pattern of FIG. 13.

FIG. 14 depicts an example implementation 1400 showing modification to the projection pattern of FIG. 13. In this example, the modification is made to return the maximum number of days since the matched events as illustrated. A projection pattern may also be used to inject additional labels and to control how the matched instances get written to the output file.

Return will now be made to the example implementation 800 of FIG. 8. As described earlier, the illustrated filter pattern traces install failures of packages. Typically, there may be multiple matches, with "Package" matching package names and "ErrorCode" matching the various error codes encountered during the install attempts for the corresponding packages.

Figure 15:
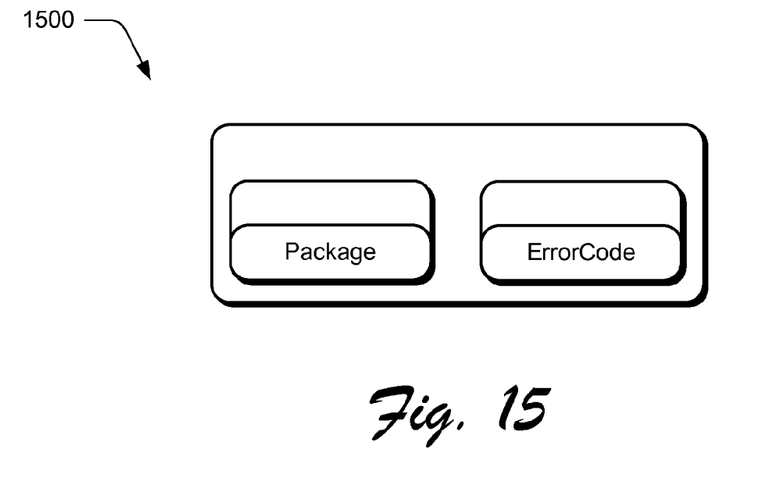
FIG. 15 is an illustration of an example implementation of a projection pattern which may be utilized to display matches found for the filter pattern of FIG. 8.

There are a number of ways in which these matches may be displayed using projection patterns. FIG. 15 is an illustration of an example implementation 1500 of a projection pattern which may be utilized to display matches found for the filter pattern of FIG. 8. The illustrated projection pattern displays the output in the following format:

```
Package1 ErrorCode1
Package1 ErrorCode2
Package1ErrorCode3
...
Package2ErrorCode1
Package2ErrorCode2
...
```

Figure 16:
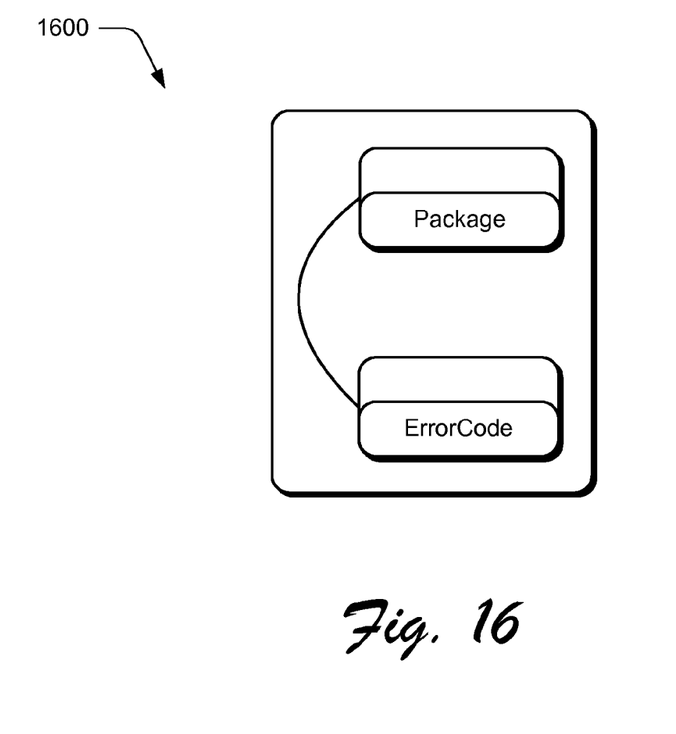
FIG. 16 is an illustration of an example implementation of another projection pattern which may be utilized to display matches found for the filter pattern of FIG. 8.

FIG. 16 is an illustration of an example implementation 1600 of another projection pattern which may be utilized to display matches found for the filter pattern of FIG. 8. In this case, the output would be displayed in the following format:

```
Package1
ErrorCode1
ErrorCode2
ErrorCode3
...
Package2
ErrorCode1
ErrorCode2
```

Thus, projection patterns may be utilized to further refine results obtained from filter patterns to control "what" is displayed and "how" it is displayed. A variety of other examples are also contemplated.

Example Procedures

The following discussion describes pattern matching framework techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the example implementations 200-1600 of FIG. 2-16, respectively.

Figure 17:
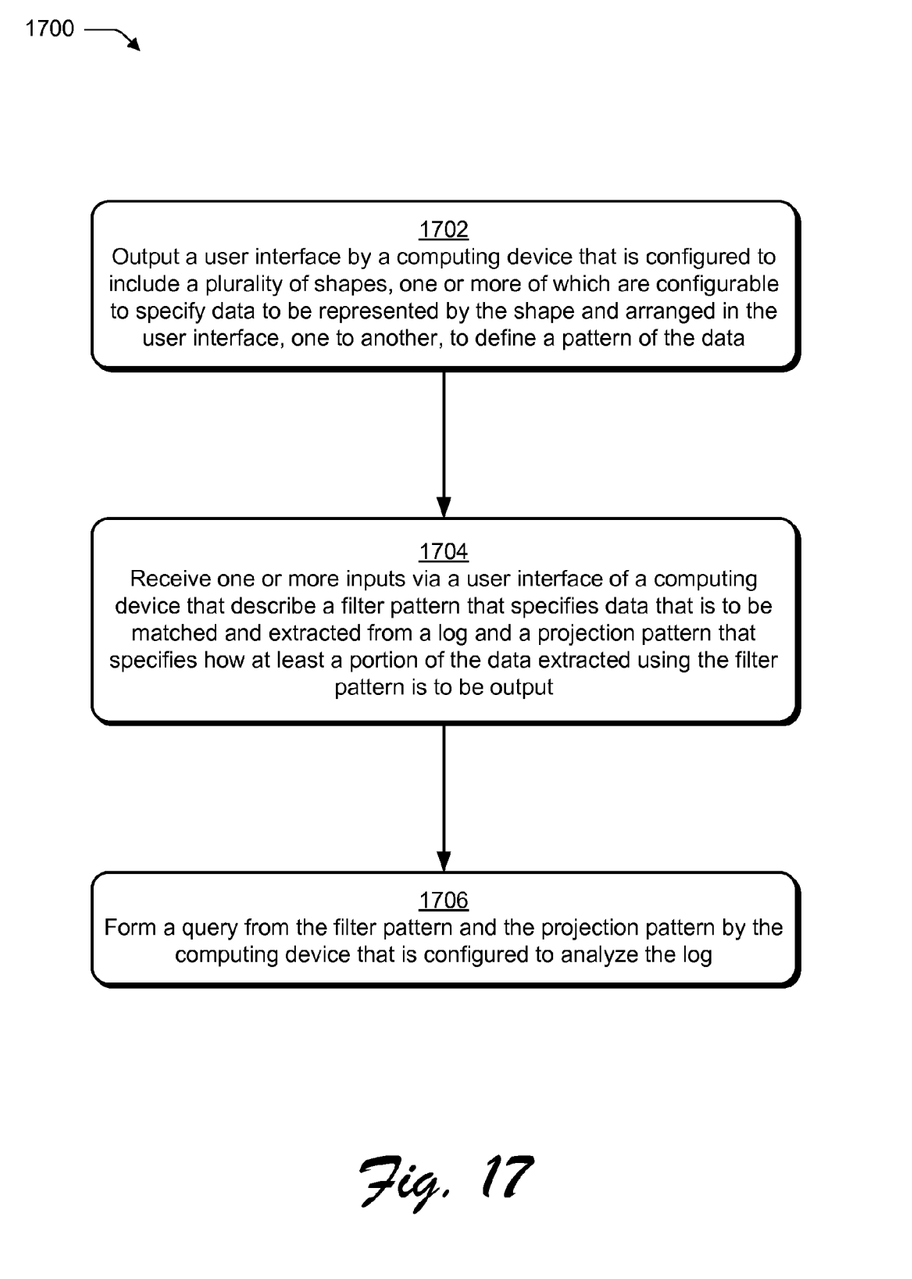
FIG. 17 is a flow diagram depicting a procedure in an example implementation in which a user interface is output to specify one or more patterns to be used as queries to analyze a log.

FIG. 17 depicts a procedure 1700 in an example implementation in which a user interface is output to specify one or more patterns to be used as queries to analyze a log. A user interface is output by a computing device that is configured to include a plurality of shapes, one or more of which are configurable to specify data to be represented by the shape and arranged in the user interface, one or another, to define a pattern of the data (block 1702). The user interface, for instance, may include a plurality of blocks as illustrated in FIGS. 2-16. One or more of the blocks may be configured to represent particular data that is to be found in a log, such as an error code and so on. Other blocks may be configured to specify occurrences and forth. A variety of other functionality may also be employed, such as to show negation operations, specify a number of lines to be spaced between portions of a pattern, leave an undefined number of lines between portions of a pattern, and so on as previously described.

One or more inputs are received via the user interface of the computing device that describe a filter pattern that specifies data that is to be matched and extracted from a log and a projection pattern that specified how at least a portion of the data extracted using the filter pattern is to be output (block 1704). Filter patterns as described in relation to FIGS. 2-11 may be used to define a pattern of data that is to be considered a match and thus extracted (e.g., copied) from a log. The projection patterns may or may not be used to further define how or even if this data is to be output, such as in what arrangement.

A query is formed from the filter pattern and the projection pattern by the computing device that is configured to analyze the log (block 1706). The pattern matching engine 120 of FIG. 1, for instance, may use the filter patterns and the projection patterns as queries 110 to analyze a log 108, further discussion of which may be found in relation to the following figure.

Figure 18:
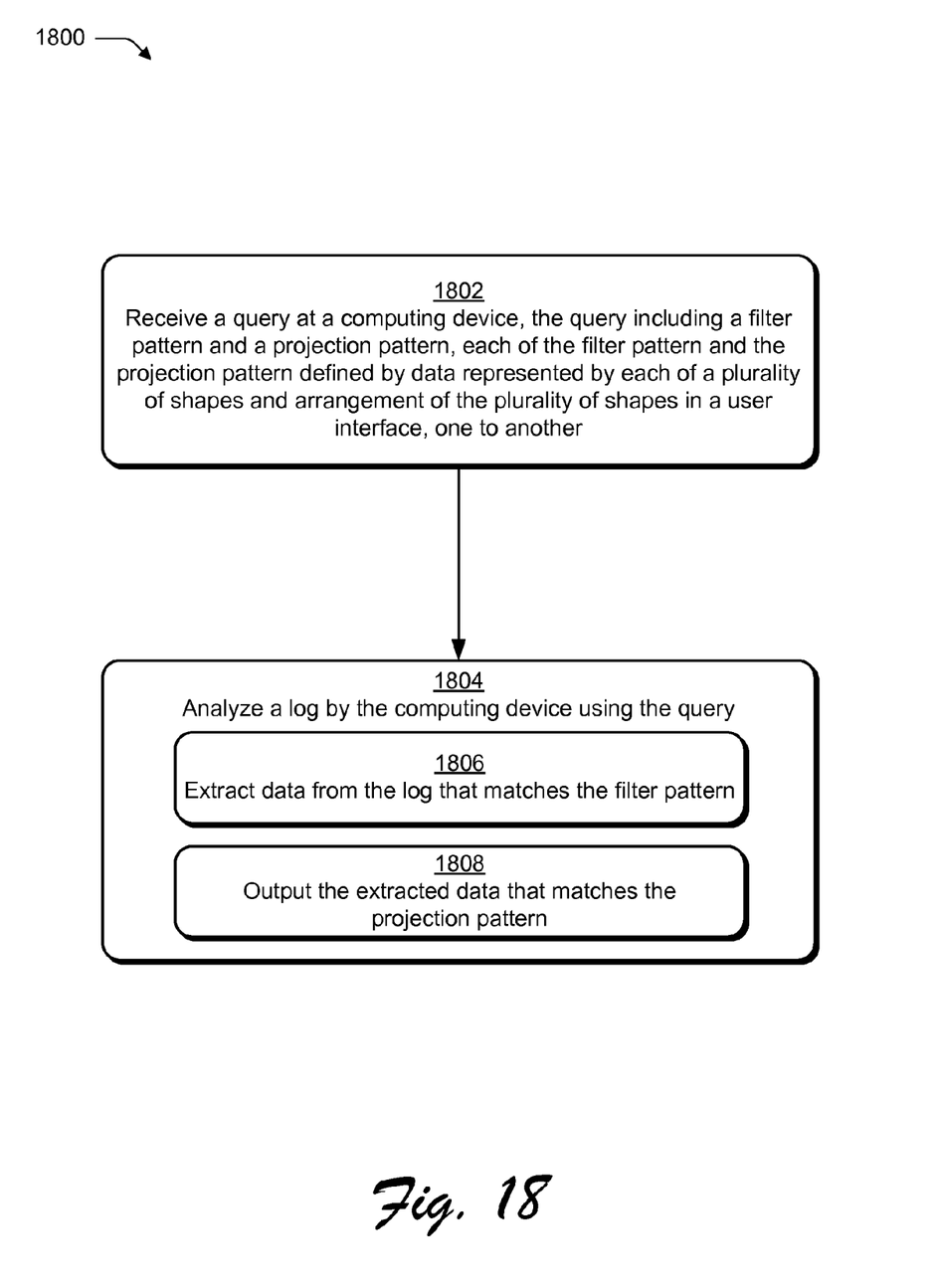
FIG. 18 is a flow diagram depicting a procedure in an example implementation in which a query is received to analyze a log

FIG. 18 depicts a procedure 1800 in an example implementation in which a query is received to analyze a log. A query is received at a computing device, the query including a filter pattern and a projection pattern, each of the filter pattern and the projection pattern defined by data represented by a plurality of shapes and arrangement of one or more of the plurality of shapes in a user interface, one to another (block 1802). As previously described, a user may interact with a user interface output by the computing device 102 to specify patterns.

A log is analyzed by the computing device using the query (block 1804), which includes extracting data from the log that matches the filter pattern (block 1806) and output of the extracted data that matches the projection pattern (block 1808). Thus, the filter patterns may be used to locate data in the log 106 and the projection patterns may be used to define how that data is to be output.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    outputting, by a computing device, a user interface configured to display data elements that are user-selectable to arrange and represent data patterns that include a filter pattern defining a search for data and a projection pattern defining a data output for the data that is matched by the filter pattern;
    receiving one or more inputs via the user interface of the computing device to define and arrange the data elements describing the filter pattern that specifies the data to be matched and extracted from a log, and the data elements describing the projection pattern that specifies a format of the data output for at least a portion of the data extracted from the log using the filter pattern, the specification by the projection pattern including global variables, bound variables from the filter pattern, aggregation functions, and type cast operations; and
    forming, by the computing device, a query from the filter pattern and the projection pattern to analyze the log.

2. A method as described in claim 1, wherein:
    the data elements are configured to specify particular data for respective said data elements that is to be matched from the log; and
    the arrangement of the data elements, one to another, is configured to specify an arrangement of the data in the log that is to be considered as a match of the filter pattern.

3. A method as described in claim 1, wherein:
    the data elements are configured to specify particular data for respective said data elements that is to be output from the data extracted from the log by the filter pattern; and
    the arrangement of the data elements, one to another, is configured to specify an arrangement of the data extracted from the log that is to be considered as a match of the projection pattern.

4. A method as described in claim 1, wherein the user interface is configured to specify that values are to be bound to corresponding variables that are represented by respective said data elements.

5. A method as described in claim 1, wherein the specification by the projection pattern includes injecting one or more labels to the portion of the data extracted.

6. A method as described in claim 1, wherein the user interface is configured to specify a number of occurrences of a match in the log of at least a portion of a respective said filter pattern or projection pattern for finding a match for the respective said filter pattern or projection pattern.

7. A method as described in claim 1, wherein the user interface is configured to specify separation of a number of lines in the log of respective portions of a respective said filter pattern or projection pattern for finding a match for the respective said filter pattern or projection pattern.

8. A method as described in claim 1, wherein the user interface is configured to define portions of a respective said filter pattern or projection pattern as separated by an undefined number of lines in the log for finding a match for the respective said filter pattern or projection pattern.

9. A method as described in claim 1, wherein the global variables include a data file filename, a first timestamp indicating a start of query processing, a second timestamp indicating an end of the query processing, and a current date.

10. A computing device, comprising:
    a display device configured to display a user interface that displays data elements, which are user-selectable to arrange in the user interface and represent data patterns that include a filter pattern defining a search for data and a projection pattern defining a data output for the data that is matched by the filter pattern;
    a memory and processor system to implement a query builder module that is configured to:
    receive one or more inputs via the user interface to define and arrange the data elements describing the filter pattern that specifies the data to be matched and extracted from a log, and the data elements describing the projection pattern that specifies a format of the data output for at least a portion of the data extracted from the log using the filter pattern, the specification by the projection pattern including global variables, bound variables from the filter pattern, aggregation functions, and type cast operations; and
    form a query from the filter pattern and the projection pattern, as defined by the arrangement of the data elements, one to another, to analyze the log.

11. A computing device as described in claim 10, wherein the filter pattern is represented as a two-dimensional pattern by the arrangement of the data elements, and the filter pattern specifies the data that is to be matched and extracted from the log.

12. A computing device as described in claim 11, wherein the projection pattern that specifies whether one or more labels are injected into at least a portion of the data extracted using the filter pattern is to be output.

13. A computing device as described in claim 10, wherein the user interface is configured to specify that values are to be bound to corresponding variables that are represented by respective said arrangement of the data elements to represent the data patterns.

14. A computing device as described in claim 10, wherein the user interface is configured to specify a number of occurrences of a match in the log of at least a portion of the filter pattern for finding a match for the filter pattern.

15. A computing device as described in claim 10, wherein the user interface is configured to specify separation of a number of lines in the log of portions of the filter pattern for finding a match for the filter pattern.

16. A computing device as described in claim 10, wherein the user interface is configured to define portions of the filter pattern as separated by an undefined number of lines in the log for finding a match for the filter pattern.

17. A method comprising:
receiving a query at a computing device, the query including a filter pattern and a projection pattern, the filter pattern defining a search for data and the projection pattern defining a data output for the data that is matched by the filter pattern, each of the filter pattern and the projection pattern defined by data patterns represented by data elements that are user-selectable and arranged in a user interface;
analyzing a log by the computing device using the query, the analyzing including:
extracting the data from the log that matches the filter pattern; and
outputting the extracted data that matches the projection pattern, which specifies a format of the data output for at least a portion of the data that is to be output to a data file based in part on the arrangement of the data elements, the specification by the projection pattern including global variables, bound variables from the filter pattern, aggregation functions, and type cast operations.

18. A method as described in claim 17, wherein the filter pattern or the projection pattern is configured to specify a number of occurrences of a match in the log of at least a portion of a respective said filter pattern or projection pattern for finding a match for the respective said filter pattern or projection pattern.

19. A method as described in claim 17, wherein the filter pattern or the projection pattern is configured to specify separation of a number of lines in the log of respective portions of a respective said filter pattern or projection pattern for finding a match for the respective said filter pattern or projection pattern.

20. A method as described in claim 17, wherein the filter pattern or the projection pattern is configured to define portions of a respective said filter pattern or projection pattern as separated by an undefined number of lines in the log for finding a match for the respective said filter pattern or projection pattern.

* * * * *